(12) United States Patent
Griffith

(10) Patent No.: US 8,948,960 B2
(45) Date of Patent: Feb. 3, 2015

(54) SYSTEMS AND METHODS FOR ARBITRATING SENSOR AND ACTUATOR SIGNALS IN A MULTI-CHANNEL CONTROL SYSTEM

(75) Inventor: Scot E. Griffith, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1966 days.

(21) Appl. No.: 11/948,409

(22) Filed: Nov. 30, 2007

(65) Prior Publication Data
US 2009/0143924 A1 Jun. 4, 2009

(51) Int. Cl.
*G06F 11/30* (2006.01)
*G07C 5/00* (2006.01)
*G06F 11/18* (2006.01)
*G06F 11/16* (2006.01)
*G07C 5/08* (2006.01)
*F02D 41/22* (2006.01)

(52) U.S. Cl.
CPC ............ *G06F 11/18* (2013.01); *G06F 11/1629* (2013.01); *G06F 11/182* (2013.01); *G07C 5/0808* (2013.01); *F02D 41/22* (2013.01)
USPC ............ 701/29.1; 701/3; 701/29.7; 701/30.3; 701/31.7; 701/36; 700/2; 700/3; 700/19; 700/20; 244/75.1; 244/99.2; 244/99.4; 714/E11.007; 714/E11.016; 714/E11.054; 714/E11.055; 714/E11.072; 714/E11.079; 714/E11.08; 714/E11.081; 714/E11.091; 714/E11.092

(58) Field of Classification Search
CPC . G06F 11/16; G06F 11/1608; G06F 11/1629; G06F 11/1633; G06F 11/1637; G06F 11/18; G06F 11/182; G06F 11/183; G06F 11/184; G06F 11/185; G07C 5/0808; G07C 5/0816; G07C 5/0841; F02D 41/22; F02D 41/221; F02D 41/222

USPC ................ 701/3, 29, 33–36, 29.1, 29.7, 30.3, 701/31.7; 700/2, 3, 19, 20, 247, 249; 244/75.1, 99.2, 99.4; 709/208; 714/11, 714/21, 43, E11.007, E11.016, E11.054, 714/E11.055, E11.072, E11.079–E11.081, 714/E11.091, E11.092, 30–31
See application file for complete search history.

(56) References Cited

U.S. PATENT DOCUMENTS 3,688,099 A 8/1972 Buscher
4,032,757 A 6/1977 Eccles (Continued)

*Primary Examiner* — Jack W Keith
*Assistant Examiner* — Chuong P Nguyen
(74) *Attorney, Agent, or Firm* — Ingrassia Fisher & Lorenz, P.C.

(57) ABSTRACT

Systems and methods are provided for arbitrating sensor and actuator signals in various devices. One system includes input/output (I/O) circuitry, redundant computation circuits coupled to the I/O circuitry, and an arbitration circuit coupled between the I/O circuitry and the redundant computation circuits. The I/O circuitry is configured to be coupled to multiple non-redundant systems, and the redundant computation circuits are configured to be coupled to one of multiple system buses. One such device is an aircraft including multiple non-redundant systems and a plurality of system buses that are configured to transmit redundant messages to the non-redundant systems. A method includes receiving notice that redundant control signals have been received by multiple computation circuits, determining the health of each computation circuit, selecting a computation circuit from which to receive a control signal based on its health level, and transmitting the control signal from the selected computation circuit to I/O circuitry.

11 Claims, 2 Drawing Sheets

(56) References Cited

U.S. PATENT DOCUMENTS

| | | |
|---|---|---|
| 4,327,437 A | 4/1982 | Gelderloos |
| 4,422,180 A | 12/1983 | Wendt |
| 4,517,639 A | 5/1985 | Ferrell et al. |
| 4,722,061 A | 1/1988 | Carlisle et al. |
| 4,785,403 A | 11/1988 | Kuhlberg |
| 4,849,893 A | 7/1989 | Page et al. |
| 4,916,612 A | 4/1990 | Chin et al. |
| 5,001,638 A | 3/1991 | Zimmerman et al. |
| 5,107,425 A | 4/1992 | Donges |
| 5,206,810 A | 4/1993 | Bools et al. |
| 5,233,542 A | 8/1993 | Hohner |
| 5,274,554 A | 12/1993 | Takats et al. |
| 5,349,654 A | 9/1994 | Bond et al. |
| 5,469,447 A | 11/1995 | Brunemann, Jr. et al. |
| 5,515,282 A | 5/1996 | Jackson |
| 5,550,736 A | 8/1996 | Hay et al. |
| 5,802,077 A | 9/1998 | Yeh |
| 5,993,055 A * | 11/1999 | Williams ................ 714/732 |
| 6,766,230 B1 * | 7/2004 | Rizzoni et al. ........... 701/32.9 |
| 6,895,582 B1 * | 5/2005 | Greve ..................... 718/1 |
| 7,017,861 B1 | 3/2006 | Johansson et al. |
| 7,020,076 B1 | 3/2006 | Alkalai et al. |
| 7,031,810 B2 * | 4/2006 | Foch et al. ............... 701/3 |
| 7,093,168 B2 | 8/2006 | Mahoney |
| 7,206,877 B1 * | 4/2007 | Doerenberg et al. ........ 710/100 |
| 7,209,809 B2 | 4/2007 | Yeh |
| 7,272,681 B2 | 9/2007 | Davies |
| 2004/0098140 A1 * | 5/2004 | Hess ..................... 700/3 |
| 2004/0195460 A1 | 10/2004 | Sailer |
| 2005/0085957 A1 * | 4/2005 | Yeh ...................... 701/3 |
| 2007/0033511 A1 * | 2/2007 | Davies ................... 714/799 |
| 2007/0135975 A1 | 6/2007 | Stange et al. |
| 2007/0223533 A1 * | 9/2007 | Kirrmann et al. .......... 370/469 |
| 2008/0319622 A1 * | 12/2008 | Katrak et al. ............ 701/70 |
| 2009/0312892 A1 * | 12/2009 | Mahoney et al. .......... 701/3 |

* cited by examiner

SYSTEMS AND METHODS FOR ARBITRATING SENSOR AND ACTUATOR SIGNALS IN A MULTI-CHANNEL CONTROL SYSTEM

TECHNICAL FIELD

The present invention generally relates to control systems, and more particularly relates to systems and methods for arbitrating sensor and actuator signals using a multi-channel control system.

BACKGROUND

Aerospace vehicles generally include multiple systems for which a high level of reliability is desired. One way of effectively increasing system reliability is to include redundant systems having a primary system and one or more backup systems. Such a configuration enables the backup system(s) to take over control or become a replacement system for essential functions in the unlikely event that the primary system experiences a malfunction. While the inclusion of redundant systems is an method effective of increasing system reliability, the inclusion of one or more additional systems increases the overall cost and size of the overall system.

Another way of increasing reliability is by arranging each of the systems in a "federated" configuration. That is, each system on the aerospace vehicle includes its own controller. While federated configurations are an effective way of increasing system reliability, the inclusion of a controller for each system increases the total cost and real estate needed for each system.

To reduce the cost and real estate used by the various systems in an aerospace vehicle, the systems may be networked so that they are managed by a single controller. While eliminating one or more controllers via networking certainly decreases the cost and real estate used by the various systems, more than one system may be affected by the unlikely event that the single controller experiences a malfunction.

Accordingly, it is desirable to provide systems and methods for providing reliable and cheaper system networking on an aerospace vehicle. Specifically, it is desirable to provide systems and methods for arbitrating sensor and actuator signals using a multi-channel control system. Furthermore, other desirable features and characteristics of the present invention will become apparent from the subsequent detailed description of the invention and the appended claims, taken in conjunction with the accompanying drawings and this background of the invention.

BRIEF SUMMARY

Systems are provided for arbitrating sensor and actuator signals in devices including a plurality of non-redundant systems and a plurality of system buses. One system comprises input/output (I/O) circuitry configured to be coupled to each of the plurality of non-redundant systems and a plurality of redundant computation circuits coupled to the I/O circuitry, wherein each of the plurality of redundant computation circuits is configured to be coupled to one of the plurality of system buses. The system also comprises an arbitration circuit coupled between the I/O circuitry and the plurality of redundant computation circuits, wherein the arbitration circuit is configured to select one of the redundant computation circuits for transmission of a control signal to one of the plurality of non-redundant systems.

Various embodiments of the devices include aircraft. An exemplary aircraft comprises a plurality of non-redundant systems and a plurality of system buses configured to transmit redundant messages to the non-redundant systems. The aircraft also comprises an arbitration apparatus coupled between the plurality of non-redundant systems and the plurality of system buses, wherein the arbitration apparatus is configured to select one of the redundant messages for transmission to one of the non-redundant systems.

Various embodiments of the invention also provide a method for arbitrating sensor and actuator signals in a system including a plurality of non-redundant systems in communication with a plurality of system buses via a plurality of computation circuits. One method comprises the steps of receiving notice that a plurality of redundant control signals have been received by the plurality of computation circuits and determining a health level of each computation circuit. The method also comprises the steps of selecting a computation circuit to transmit one of the redundant control signals based on the determined health level of each computation circuit and transmitting the control signal from the selected computation circuit to the I/O circuitry.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
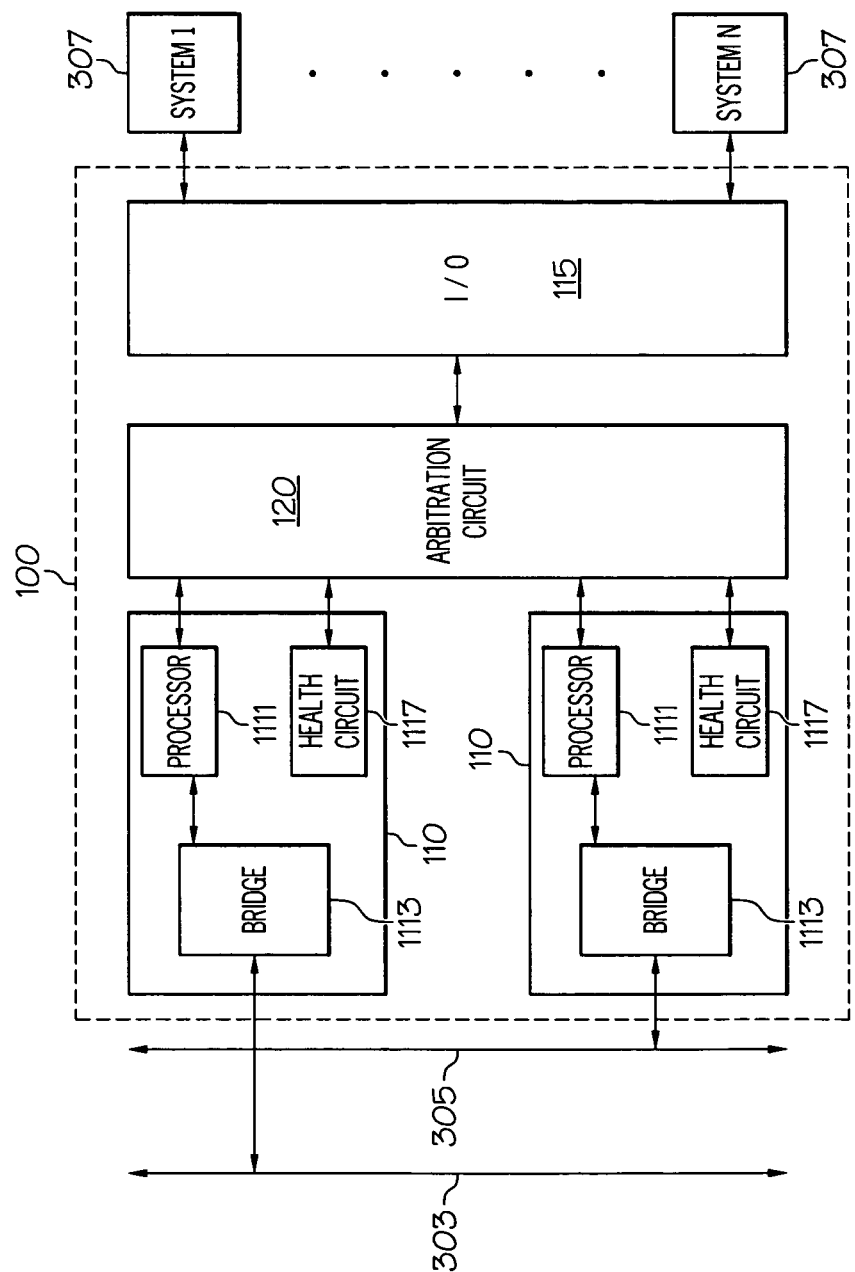
FIG. 1 is a block diagram of one embodiment of a multi-channel system coupled to a plurality of system buses and a plurality of non-redundant or single-string systems.

FIG. 1 is a block diagram of one embodiment of a multi-channel control system 100 coupled to a plurality of system buses 303, 305 and a plurality of non-redundant or single-string systems 307 (e.g., system 1 through system N). In one embodiment, system 100 is implemented on an aerospace vehicle (e.g., an airplane, a helicopter, a missile, a satellite, a space shuttle, a rocket, etc.), although system 100 may be implemented in any system or device where system reliability is desired.

In aerospace applications, each system 307 may include one or more sensors (e.g., altitude sensor, air speed sensor, fuel level sensor, thrust sensor, position sensor, and the like sensors) and one or more actuators (e.g., a device that causes a physical effect on another device), as is known in the art. For example, system 1 may include one or more sensors for detecting the position of each aileron on an aircraft and one or more actuators for changing the position of each aileron, while another system may include one or more sensors for monitoring the amount of thrust being produced by each engine of the aircraft and one or more actuators for regulating the amount of fuel being supplied to each engine. Furthermore, system N may include a single sensor for detecting the position of the aircraft door and a single actuator for opening/closing the door. As such, each system 307 may be any one of the numerous types of aerospace systems that are capable of receiving signals or messages from system buses 303, 305 and responding to such signals/messages.

System 100 includes a plurality of computation circuits 110 and an arbitration circuit 120 coupled between system buses 303, 305 and systems 307. Specifically, system 100 includes input/output (I/O) circuitry 115 coupled to each system 307 and to arbitration circuit 120. Arbitration circuit 120 is coupled to each computation circuit 110, and each computation circuit 110 is coupled to one of system buses 303, 305. For ease of understanding, system 100 is illustrated in FIG. 1 and discussed below as including two computation circuits 110; however, other embodiments of system 100 comprise more than two computation circuits 110.

Computation circuits 110 each include a processor 1111 coupled to one of system buses 303, 305 via a respective bridge 1113, and is also coupled to arbitration circuit 120. Processor 1111 and bridge 1113 may be any processor and bridge (e.g., a PCI bridge), respectively, known in the art or developed in the future. Each computation circuit 110 also comprises a health circuit 1117 coupled to arbitration circuit 120. Health circuits 1117 may be any device, hardware, firmware, and/or circuitry configured to monitor and report the level of health or health status of their respective computation circuit 110 to arbitration circuit 120. That is, health circuits 1117 are configured to report any detected faults, malfunctions, congestion, and the like conditions to arbitration circuit 120 while monitoring their respective computation circuit 110. Reporting by health circuits 1117 may be performed on a constant or substantially constant basis, or may be performed when a fault, malfunction, congestion, or the like condition is detected. In embodiments where reporting occurs when a fault, malfunction, congestion, or the like condition is detected, a computation circuit 110 may be presumed healthy if a fault, malfunction, congestion, or the like condition has not been reported by its health circuit 1117.

Arbitration circuit 120 is configured to receive notice from computation circuits 110 (specifically, processors 1111) that they each have a control signal (i.e., redundant control signals) to transmit to a system 307. Arbitration circuit 120 is further configured to then select one of the computation circuits 110 for transmission of one of the control signals to the target system 307. In one embodiment, arbitration circuit 120 may select either computation circuit 110 for transmitting the control signal to the target system 307 because computation circuits 110 each include substantially the same control signal. In another embodiment, arbitration circuit 120 is configured to receive a signal indicative of the health of each computation circuit 110 from each health circuit 1117 and compare the health of computation circuits 110 against one another to determine the "healthiest" (e.g., the greatest level of health) computation circuit 110. In this embodiment, arbitration circuit 120 is also configured to select the healthiest computation circuit 110 for transmittal of its control signal to I/O circuitry 115. If two or more computation circuits 110 are deemed to be the healthiest, arbitration circuit 120 may be configured to arbitrarily select one of the computation circuits 110, or may be configured to select a particular computation circuit 110 based on a predetermined criteria (e.g., a primary computation circuit 110, a preferred computation circuit 110, or other predetermined factor).

I/O circuitry 115 may be any device, hardware, and/or circuitry capable of driving systems 307. In the embodiment illustrated in FIG. 1, I/O circuitry 115 is analog circuitry, but in other embodiments I/O circuitry 115 may be digital circuitry.

The following is a description of the operation of one exemplary embodiment of system 100. Computation circuits 110 (specifically, processors 1111) receive the same control signal input from one of system buses 303, 305 and system state inputs from I/O circuitry 115. Processors 1111 notify arbitration circuit 120 that they have a control signal for one of systems 307. Arbitration circuit 120 then selects one of the processors 1111 and enables the selected processor 1111 to transmit the signal to I/O circuitry 115 so that I/O circuitry 115 may drive a sensor and/or an actuator in the target system 307. If arbitration circuit 120 is unable to facilitate transmittal of the signal from the processor 1111 of the selected computation circuit 110, arbitration circuit 120 selects another computation circuit 110 for transmitting the control signal to I/O circuitry 115.

During operation of another exemplary embodiment of system 100, computation circuits 110 (e.g., processors 1111) receive redundant control signal inputs from system buses 303, 305. Processors 1111 then notify arbitration circuit 120 that they each have a computed control signal to transmit to one of systems 307. After receipt of the notification, arbitration circuit 120 determines which computation circuit 110 is the "healthiest" computation circuit 110 and selects that computation circuit 110 for transmitting the control signal.

In determining the healthiest computation circuit 110, arbitration circuit 120 receives the health status of each computation circuit 110 from its respective health circuit 1117, which may occur either before or after arbitration circuit 120 is notified of the control signal. If two or more computation circuits 110 are deemed to be the healthiest, arbitration circuit 120 may select any the computation circuits 110 for transmitting the control signal to I/O circuitry 115 or may select a particular computation circuit 110 based on predetermined criteria so that I/O circuitry 115 may drive a sensor and/or an actuator in the target system 307. Once selected, the computation circuit 110 transmits the control signal to I/O circuitry 115 so that I/O circuitry 115 may drive the target system 307.

Figure 2:
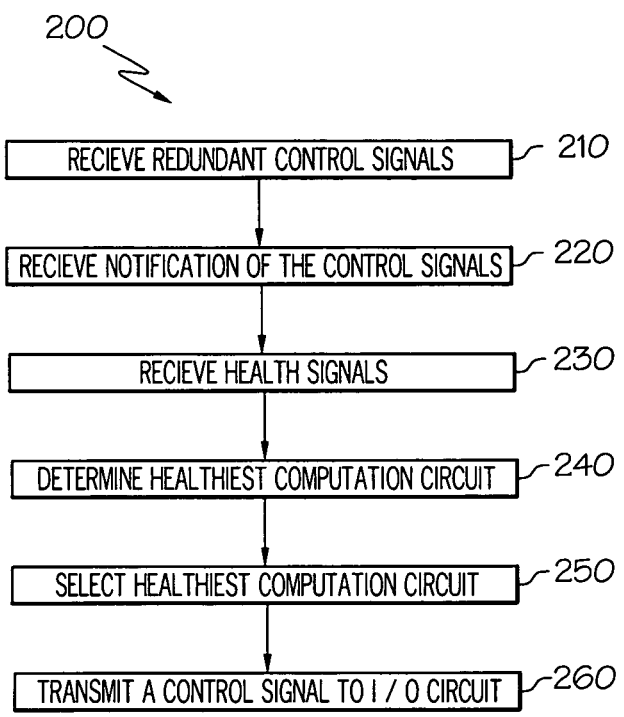
FIG. 2 is a flow diagram of an embodiment of a method for arbitrating sensor and actuator signals in a multi-channel control system.

FIG. 2 is a flow diagram of one exemplary embodiment of a method 200 for arbitrating sensor and actuator signals in a control system. Method 200 begins by receiving, by at least two computation circuits (e.g., computation circuits 110), redundant control signals from multiple system buses (e.g., system buses 303, 305) (step 210).

Arbitration circuitry (e.g., arbitration circuit 120) is notified that each computation circuit 110 has received one of the redundant signals (step 220) and also receives a signal from each computation circuit 110 indicating the health of each respective computation circuit 110 (step 230). Arbitration circuit 120 determines the healthiest computation circuit 110 based on the received health signals (step 240) and selects the healthiest computation circuit 110 from which to transmit the control signal to I/O circuitry (e.g., I/O circuitry 115) (step 250). The control signal from the selected computation circuit is then transmitted to I/O circuitry 115 so that I/O circuitry is able to drive a sensor and/or an actuator of a target system (e.g., one or more of systems 307) (step 260).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A system for arbitrating sensor and actuator signals in devices including a plurality of non-redundant systems and a plurality of system buses, comprising:
input/output (I/O) circuitry configured to be coupled to each of the plurality of non-redundant systems;
a plurality of redundant computation circuits coupled between the I/O circuitry and one of the plurality of system buses; and
an arbitration circuit coupled between the I/O circuitry and the plurality of redundant computation circuits,
the arbitration circuit configured to select one of the redundant computation circuits for transmission of a control signal to only one of the plurality of non-redundant systems,
the arbitration circuit further configured to select one of the plurality of redundant computation circuits for receipt of the redundant message based on a reported health status of each redundant computation circuit, the reported health status of each redundant computation circuit based upon at least one of: a detected fault in the redundant computation circuit or data congestion detected in the computations performed by the redundant computation circuit.

2. The system of claim 1, wherein at least two of the plurality of redundant computation circuits are configured to transmit a redundant message to the I/O circuitry via the arbitration circuit.

3. The system of claim 2, wherein each of the plurality of redundant computation circuits comprises a health status circuit coupled to the I/O circuitry.

4. The system of claim 3, wherein the arbitration circuit is configured to receive the health status of each redundant computation circuit from each respective health status circuit.

5. The system of claim 3, wherein each of the plurality of redundant computation circuits further comprises a bridge coupled the processor and configured to be coupled to the one of the plurality of system buses.

6. An aircraft, comprising:
a plurality of non-redundant systems;
a plurality of system buses configured to transmit redundant messages to the plurality of non-redundant systems;
a plurality of computation circuits, each computation circuit coupled to one of the plurality of system buses; and
an arbitration apparatus coupled between the plurality of non-redundant systems and the plurality of system buses, the arbitration apparatus configured to select only one of the redundant messages for transmission to one of the plurality of non-redundant systems,
the arbitration apparatus further coupled to each of the plurality of computation circuits, each computation circuit coupled to one of the plurality of system buses, each computation circuit coupled to and in communication with the arbitration apparatus,
the arbitration apparatus configured to select one of the plurality of redundant computation circuits for receipt of the one of the redundant messages based on a reported health status of each redundant computation circuit, the reported health status of each redundant computation circuit based upon at least one of: a detected fault in the redundant computation circuit or data congestion detected in the computations performed by the redundant computation circuit.

7. The aircraft of claim 6, wherein each of the plurality of redundant computation circuits comprises a health status circuit coupled to the arbitration circuit.

8. The aircraft of claim 7, wherein the arbitration circuit is configured to receive the health status of each computation circuit from each respective health status circuit.

9. The aircraft of claim 6, wherein each of the plurality of computation circuits comprises a processor coupled to the arbitration circuit and one of the plurality of system buses.

10. The aircraft of claim 9, wherein the arbitration apparatus further comprises input/output (I/O) circuitry coupled between the arbitration circuit and each of the plurality of non-redundant systems.

11. The aircraft of claim 10, wherein each of the plurality of computation circuits comprises a bridge coupled between its processor and one of the plurality of system buses.

* * * * *